Oct. 30, 1945.    A. D. GARRISON ET AL    2,388,048
RECOVERY OF HYDROCARBONS FROM HIGH PRESSURE FLUIDS
Filed March 13, 1942    2 Sheets-Sheet 1

FIG. I.

ALLAN D. GARRISON
WILLIAM D. YALE
INVENTORS
THEIR ATTORNEYS

FIG.2.

Patented Oct. 30, 1945

2,388,048

UNITED STATES PATENT OFFICE 2,388,048

RECOVERY OF HYDROCARBONS FROM HIGH-PRESSURE FLUIDS

Allen D. Garrison, Houston, and William D. Yale, Port Arthur, Tex., assignors to Texaco Development Corporation, New York, N. Y., a corporation of Delaware Application March 13, 1942, Serial No. 434,460

20 Claims. (Cl. 196—8)

This invention relates to high pressure absorption processes for the separation of liquefiable hydrocarbons and lighter, normally gaseous, hydrocarbons. More particularly, the invention relates to an improved high pressure absorption process for the recovery of liquefiable hydrocarbons from fluids flowed from wells tapping so-called distillate or condensate formations.

In the production of distillate fields, it is important that the residual gases be returned to the formation for the purpose of maintaining formation pressures, although in some cases the gas may be returned to a formation other than that from which the fluid is removed. Accordingly, the efficiency of a process for the production of distillate is dependent in an important measure upon the pressure at which separation of liquefiable hydrocarbons from residual gases is accomplished. The pressure at which distillate fluids may be flowed from a producing well may vary from about 1500 pounds to a pressure of the order of 5000 pounds per square inch, depending upon the formation pressure and the well equipment. As deep drilling continues, even higher pressures may be expected. The well head pressure of a flowing distillate well is normally within the retrograde condensation range of the constituents of the distillate fluid, but a well producing a fluid, subject to retrograde condensation, at a pressure above the retrograde condensation range would still be considered a distillate well. Although formation temperatures are considerably higher, it appears that the temperature of distillate fluids at the head of the production well vary from about 90° to 175° F.

The problem of separating liquefiable hydrocarbons from residual gases in distillate fluids has been attacked in various ways, and processes involving a relatively high pressure absorption step have found considerable favor. In these processes the absorption has been carried out at pressures somewhat below 2000 pounds per square inch. So far as known, no commercial process has been devised to operate at higher pressures. Proposals have been advanced in that direction, but none seem to have provided an effective solution for certain problems arising during high pressure operation.

In accordance with the present invention, the production of a distillate field is carried out by a process involving a high pressure absorption step which may be carried out at pressures not substantially below well-head pressure, or, where the well-head pressure is particularly high, at some lower pressure. The absorption is preferably effected at a pressure of above 2000 pounds per square inch, particularly in cases where the well-head pressure is of this order. The process is especially effective when the absorption is accomplished at a pressure above 2500 pounds per square inch, more particularly above 3000 pounds per square inch.

One problem that arises when operating an absorption step at high pressures of above 3000 pounds per square inch is due to the fact that the equilibrium constants (i. e. mol ratio of component in vapor phase to component in liquid phase) of the various constituents of the high pressure fluid are not sufficiently distinct to permit clean cut separation of the desired liquefiable hydrocarbons, such as the pentanes and heavier and a substantial part of the butanes, from lighter hydrocarbons, such as methane, ethane and propane, by ordinary methods. As a result, when operating in the usual manner, an important amount of methane and other light hydrocarbons is absorbed in the absorption oil and cannot be made available for return to the formation without extensive compression.

In the present process an absorption oil is used which contains a substantial proportion of absorbed methane and other light hydrocarbons such as ethane. By proceeding in this way it is obvious that only a small proportion of these light hydrocarbons will be absorbed and that the remainder, constituting usually well above 90 per cent of the quantity of these gases present in the distillate fluid, will be available at the high pressure of the absorption for compression and return to a producing formation for maintaining pressures.

In accordance with the present invention, the fat absorption oil leaving the absorption step, which will be substantially saturated with the light components at the absorption pressure and temperature, and will contain the desired liquefiable components, is passed to a reabsorption system which will usually consist of two or more reabsorbers. In this system the pressure on the fat oil is reduced, preferably in stages. As a result of this reduction in pressure, the light hydrocarbons are vaporized together with a proportion of the desired liquefiable hydrocarbons such as the pentanes. In accordance with the invention, the vapors formed in the reabsorption system are contacted with the lean absorption oil under conditions such that the vapors are absorbed. The lean oil therefore contains a substantial proportion of methane and other light hydrocarbons at the conditions of reabsorption, and when this lean oil is used for absorption at high pressures, it takes up the heavier hydrocarbons while permitting the lighter hydrocarbons to pass on, thereby making these lighter hydrocarbons available for return to the producing formation. Since the mols of hydrocarbons per unit volume present in the absorption oil are increased, the absorption of the desired liquefiable hydrocarbons is also improved.

Important features of the invention are the methods of adjusting the conditions of reabsorption so as to accomplish the foregoing objects. In a stage of reabsorption the rate of introduction of lean oil determines the pressure of the reabsorption, this pressure adjusting itself automatically such that the flashed vapors from the fat absorption oil are absorbed by the lean oil. A reabsorption procedure of the type described would not be effective by simply contacting the flashed vapors with the lean oil on its way to the absorber; it is necessary to adjust the conditions of reabsorption so as to make possible the substantially complete absorption of the flashed vapors. It is noted that if a substantial proportion of the flashed vapors is permitted to leave the system at the pressures of reabsorption, these vapors can be used for repressuring or for absorption or reabsorption only by means of an expensive compression step.

In accordance with one preferred embodiment of the invention, a greater quantity of lean oil is circulated through the reabsorption system than is used in the absorption step, and the excess lean oil containing constituents absorbed in the reabsorption is combined with the fat oil and further treated with that oil. In proceeding in this way the vapors are preferably first contacted with the excess lean oil, which is to be combined with the fat oil, and then with portion of the lean oil which is introduced into the absorber or an earlier reabsorption stage. This manner of proceeding has important advantages arising out of the fact that the lean oil with which the vapors are first contacted absorbs a greater quantity of the more easily absorbed constituents of the vapors, which are desired liquefiable hydrocarbons, usually pentanes and heavier, and the lean oil that is passed into the absorption system contains mainly absorbed lighter constituents.

In accordance with another embodiment of the invention, the lean oil before use in reabsorption is cooled to a temperature such that in the reabsorption the hydrocarbon vapors from the fat oil may be absorbed. Thus, in this case it is preferred to employ substantially all of the lean oil entering the reabsorption system for absorption. It has the disadvantages, as compared with the system previously described, that refrigeration is required and there is no separation of the light from the heavier hydrocarbons in reabsorption.

In order that the invention may be understood more fully, reference should be had to the accompanying drawings, in which.

For purposes of illustration, the invention will be described in connection with the production of distillate from a producing formation having a pressure such that the well-head pressure is about 3500 pounds per square inch. In cases of this kind, the formation pressure will be about 4000 to 4500 pounds per square inch or above. Since in many distillate fields it has been found that the reservoir conditions are at or near the conditions defined by the two-phase boundary on the temperature-pressure plane for the distillate fluid, or may even be slightly within the two-phase region, on bringing the fluid to the surface in a production well the temperature and pressure are reduced so as to be substantially within the two-phase region. Thus, normally the fluid obtained from a production well will contain condensed liquid in the form of entrained droplets.

Figure 1:
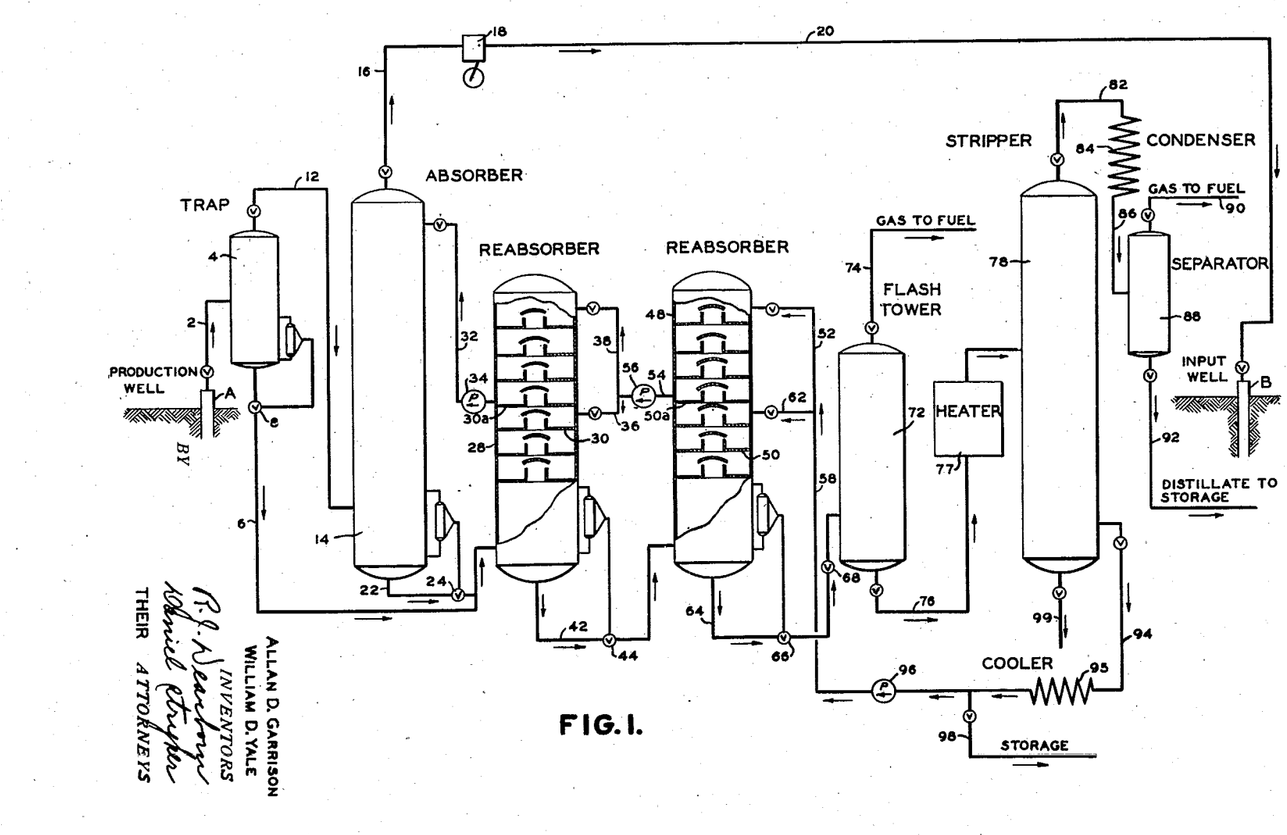
Figure 1 is in the nature of a flow sheet or diagrammatic illustration of an arrangement of apparatus in which a process constituting an embodiment of the invention may be carried out.

Referring to Figure 1 of the drawings, the distillate fluid may be removed from a production well A at a temperature of about 115° F. through a valved line 2 leading to a separator or trap 4. This trap may be maintained at a pressure slightly below the well-head pressure to account for line drop, for example, a pressure of about 3400 pounds per square inch. Due to the drop in pressure, the temperature in this trap may be of the order of 110° F. In the trap the entrained liquid is separated from the remainder of the fluid and is removed through line 6 which is provided with liquid level control valve 8. The remainder of the well fluid, which is in the vapor phase, is removed from trap 4 through valved line 12 leading to the absorber 14. In this absorber, which may be provided with trays or Raschig rings or other means for causing intimate contact of liquid and vapors, the vapors are contacted with an absorption oil which has been previously treated in the manner described below. The residual gases, which are substantially denuded of liquefiable hydrocarbons, pass from the absorber through valved line 16 leading to a compressor 18. By means of the compressor the pressure on the gases is raised to a pressure sufficiently high to permit their injection into a producing formation, preferably the one from which the distillate fluid was removed. The compressed gas is passed through valved line 20 leading to input well B and thence into the formation.

The fat absorption oil is removed from the bottom of the absorber through line 22, provided with liquid level control valve 24. The condensed distillate removed from the trap 4 through line 6 is admixed with the fat absorption oil in line 22, and the combined fluids then pass into the first reabsorber 28.

The pressure in this reabsorber is maintained at some pressure substantially below the pressure of absorption. It will be understood that when proceeding in accordance with this embodiment or other embodiments of the invention, the efficiency desired in the main absorber is the controlling consideration, and that the oil rates and other factors are varied so as to attain this efficiency. The oil rate, number of reabsorbers, distillate fluid absorbed, structure of reabsorber, etc. determine the pressure in the first reabsorber. It may be stated in general that when the absorption is carried out at a pressure of the order of that described above, the first reabsorption step may be carried out at pressures between 2400 and 1600 pounds per square inch. Also, it is preferred to carry out this step at the maximum pressure at which the desired results can be accomplished.

As shown, the reabsorber is provided with bubble cap trays 30. Leading from the side of the reabsorber, opposite a tray 30a, is valved line 32 provided with pump 34 through which absorption oil may be passed into absorber 14.

The combined fat oil and heavy distillate is introduced into the reabsorber at the lower pressure and a part of the absorbed hydrocarbons is flashed off. These vapors pass upwardly through the reabsorber. In the portion of the reabsorber below the tray 30a, the vapors are contacted with a small proportion of lean absorption oil introduced through line 36. In this portion of the reabsorber a substantial proportion of the heavier hydrocarbons which it is desired to recover, such as the butanes and heavier or the pentanes and heavier in the vapors, is absorbed, and the absorption oil containing these hydrocarbons passes into the bottom of the reabsorber and is combined with the fat oil. The remaining vapors, consisting largely of light hydrocarbons, pass into the upper portion of the reabsorber above the tray 30a and there come into contact with the bulk of the lean absorption oil introduced through valved line 38. The flow of oil into this reabsorber is varied in accordance with the desired recovery and the oil absorbs the flashed vapors. Thus, the lean oil removed through line 32 may be substantially saturated with light components.

The arrangement described permits control of heavy hydrocarbon recovery by the rate of introduction of oil. It is desired to produce in the first reabsorption step an absorption oil having the characteristics wanted with respect to light hydrocarbon content and being relatively free from hydrocarbons such as butanes and pentanes, which it is desired to absorb from the distillate fluid. It will be noted that liquid level control valves 8 and 24 maintain the selected levels of liquid in trap 4 and absorber 14 regardless of the pressure in the reabsorber. The pressure in the reabsorber is automatically adjusted to the pressure at which the evolution of vapors from the fat oil is just at the rate at which the vapors are absorbed by the oil introduced through lines 36 and 38 at the rate required by the desired absorption efficiency.

The liquid collecting in the bottom of reabsorber 28 is removed through line 42, which is provided with liquid level control valve 44. This line leads into a second reabsorber 48, provided with bubble cap trays 50. In this reabsorber the pressure may be maintained at 1200 to 700 pounds per square inch and the operation is similar to that described in connection with reabsorber 28. Thus, lean oil introduced into the upper portion of the reabsorber through valved line 52 is collected on a tray 50a and is removed through line 54 provided with pump 56, and passed into the first reabsorber. In reabsorber 48, a portion of the lean oil, which enters the system through line 58, may be introduced into the lower portion of the reabsorber through valved line 62. However, in certain cases where the vapors have a low content of liquefiable hydrocarbons and the vapors may be adequately absorbed in the upper portion of the reabsorber, the introduction of lean oil into the lower portion may be omitted.

The hydrocarbon liquid collecting in the bottom of reabsorber 48 is removed through line 64, provided with liquid level control valve 66 and pressure reducing valve 68. This line leads to a flash tower 72, which may be operated at a pressure of about 100 pounds per square inch, and in this tower additional gases are flashed off and removed through valved line 74. These gases are preferably used for fuel. It will be noted that due to the reabsorption steps previously practiced, a relatively small percentage of hydrocarbons will be vaporized in the flash tower. It is preferred to operate so that this amount does not substantially exceed that required for plant fuel. The hydrocarbon liquid collecting in the flash tower is then distilled for the separation of lean absorption oil, distillate and any remaining gases. Thus, this oil is removed through valved line 76 and passed to a heater 77 and then to a stripper 78. In the stripper, distillation is accomplished. The vapors formed are passed overhead through line 82 and condenser 84 and thence through line 86 into separator 88. Additional gases may be removed from this separator and passed through line 90 and employed for fuel. The distillate is removed through line 92 and passed to storage.

The lean absorption oil is removed from the stripper through valved line 94, leading to oil pump 96. Ordinarily to reduce the temperature to the point desired for reabsorption, the lean oil is passed through a cooler 95. In place of the cooler or in addition thereto, the lean oil may be passed into heat exchange relationship with the oil removed from flash tower 72. Since distillate fluids contain a substantial proportion of the components adapted for use in the absorption oil, a side stream of the oil from the stripper is removed to storage through line 98. Residual oil may be removed from the stripper through line 99.

In the process illustrated in Figure 1, the temperatures normally will be reduced gradually as the fat oil is passed through the system. Thus, the temperatures in reabsorber 28, reabsorber 48, and flash tower 72, under the conditions outlined, may be at slightly decreasing temperatures in the neighborhood of 100° F. In this embodiment of the invention the flashed gases may simply be removed from tower 72 and used for fuel. In some cases, however, a portion of the lean oil, for example, a side stream from line 52, may be introduced into the upper portion of this tower to absorb any liquefiable hydrocarbons in the gases.

Tracing the flow of the lean oil through the system shown in Figure 1, it will be noted that the oil passes successively through the upper portions of the two reabsorbers before coming into contact with the distillate fluid in absorber 14. Accordingly, the lean oil will become substantially saturated with light components, principally methane, at the conditions of reabsorption. The oil entering the absorber will absorb the liquefiable hydrocarbons in the distillate fluid, therefore, while permitting the passage of a substantial proportion of the light hydrocarbons. Inasmuch as the light hydrocarbons vaporized in the reabsorbers are converted to the liquid form, they may be pumped up to the pressure of the absorption step economically. The only substantial amount of gas leaving the system is that removed through line 74 and the number of absorption stages selected so that this amount does not exceed that required for fuel. Thus, substantially all of the light gases in the distillate fluid are employed usefully without the necessity for compressing a portion of these gases from relatively low pressures to the pressure required for injection.

Figure 2:
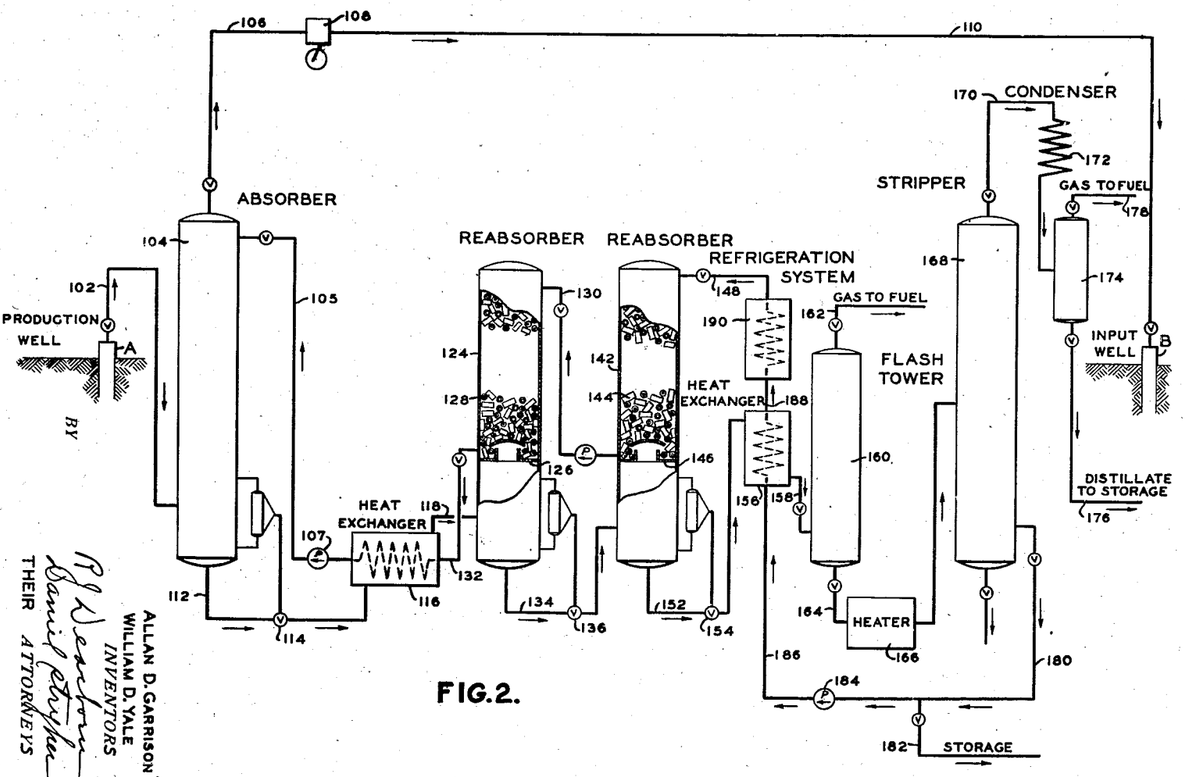
Figure 2 is a similar illustration of another embodiment.

Referring now to the embodiment of the invention illustrated in Figure 2, the distillate fluid is removed from production well A through valved line 102 and is passed directly into an absorber 104. In the absorber the fluid is contacted with absorption oil at a pressure of about 3400 pounds per square inch. For purposes of illustration it is considered that the temperature of the well fluids in this case is about 130° to 160° F., which are representative of temperatures that may be encountered in the field. The absorption may be carried out at about these temperatures. The lean absorption oil is introduced into the upper portion of the absorber through valved line 105 in which is disposed an oil pump 107. The residual gases leaving the absorber pass into valved line 106, are compressed by means of compressor 108 (for example, to a pressure of about 3900 pounds per square inch) and are returned to the formation through valved line 110 and input well B.

The fat absorption oil collecting in the bottom of the absorber is removed through line 112 provided with liquid level control valve 114. As shown, line 112 leads to heat exchanger 116 where the fat oil is brought into indirect heat exchange relationship with cool lean oil. However, in some cases this heat exchanging step may be omitted as there is an advantage in introducing warm fat oil into the following stages due to increased vaporization at the higher temperatures. In either case, the fat oil is then passed through line 118 and into the lower portion of a reabsorber 124. This reabsorber is separated into two sections by means of bubble cap plate 126 which permits the passage of vapors between the sections and supports packing material 128. This reabsorber by means of oil rates and oil temperatures may be maintained at some pressure below the absorption pressure and at a temperature such as to permit absorption of evolved vapors, which may be about 40° F.

Under these conditions vapors are released from the fat oil and pass upwardly through the reabsorber. Lean oil is introduced through valved line 130 and is mixed with and absorbs the rising vapors. The conditions are preferably adjusted so that the vapors are completely absorbed and converted to the liquid phase. The lean oil containing absorbed constituents collects on plate 126 and is removed through valved line 132 and passed to heat exchanger 116. After leaving the heat exchanger the oil is pumped up to 3400 pounds per square inch by pump 107 and is passed through line 105 and into the absorber.

The oil is removed from the bottom of reabsorber 124 through line 134, which is provided with liquid level control valve 136. The oil at a reduced pressure is passed into reabsorber 142, which may be similar in construction to reabsorber 124. Thus, it may be provided with packing material 144, and a bubble cap plate 146. This reabsorber will adjust to some pressure below the pressure in reabsorber 124 and at a temperature so that the lean oil used is capable of absorbing evolved gases, for example a temperature of about 35° F.

Oil collecting in the bottom of reabsorber 142 is removed through line 152, which is provided with a liquid level control valve 154, and is introduced into heat exchanger 156 where it comes into indirect heat exchange relationship with lean oil and serves to partially cool this oil and itself becomes heated. From the heat exchanger the oil is carried through valved line 158 to a flash tower or separator 160 which may be maintained at pressures of about 50 pounds per square inch. At this pressure a major part of the remaining light gases in the oil is evolved and is passed through valved line 162 and is preferably used for fuel. It is noted that the process is preferably operated so that the quantity of gases removed from the flash tower is not substantially in excess of the amount required for plant fuel.

The remaining oil is then passed through valved line 164, heated in heater 166, and stripped in stripper 168. The distillate fraction and some lighter gases are passed overhead through valved line 170, leading to condenser 172 and to a separator 174. Distillate is separated and passed to storage through valved line 176 and gases are removed through line 178.

The heavier fraction constituting the lean oil is removed from the stripper through valved line 180, part is passed to storage through line 182, and the remainder pumped by means of pump 184 into line 186 and thence to heat exchanger 156. From the heat exchanger 156 the lean oil is passed through line 188 and into a refrigeration system indicated generally at 190. This system, which may be an ammonia system, for example, operates to cool the oil to the temperature desired for reabsorption in reabsorber 142. The cool oil is then passed through line 148 and is employed as above described.

It will be understood that in some cases it may be desirable to combine the methods illustrated in Figures 1 and 2; i. e. in that disclosed in Figure 2 it may be desirable to use an excess of the lean oil and permit it to overflow the plates 126 and/or 146 and mix with the fat oil. Also, in cases where the lean oil tends to solidify at the low temperatures of reabsorption, the oil may be dewaxed or otherwise treated to lower its pour point prior to cooling.

It will be understood that the above two processes are merely illustrative of the invention and that various modifications may be made. For example, cooling of the lean oil may be practiced in conjunction with recycling an excess of this oil as shown in Figure 1. In this way the amount of excess required may be reduced.

It will also be understood that no attempt has been made to disclose in the drawings the specific structure of the reabsorbers which would be used in the practice of a specific application of the process. It is obvious, for example, that the number of plates required in the reabsorbers shown in Figure 1 is dependent upon the specific characteristics of the distillate fluid and the lean oil, efficiency of the design and other factors.

The process may be employed for the treatment of high pressure gases or distillate fluids of varying composition. As an example of the composition of a distillate fluid, the following is given. This fluid may be obtained at the well head at a pressure of about 3500 pounds per square inch.

*Composition of fluid*

| Hydrocarbon | Mol. fraction |
| --- | --- |
| Methane | 0.91922 |
| Ethane | 0.02801 |
| Propane | 0.01364 |
| Isobutane | 0.00490 |
| n-Butane | 0.00377 |
| Isopentane | 0.00308 |
| n-Pentane | 0.00087 |
| Hexanes | 0.00366 |
| Heptanes | 0.00418 |
| Octanes and heavier | 0.01467 |

This fluid also contained 0.00400 mol fraction of carbon dioxide. Tests indicated that the fluid in the formation was at about the dew point, and perhaps slightly below this point in the region in the neighborhood of the well; consequently, the fluid at the well head was under conditions of temperature and pressure within the two-phase region on the temperature-pressure plane and contained condensed liquid. The fluid, however, was still well within the retrograde condensation range of its constituents; i. e., substantial additional condensation of liquid would occur on further reduction in pressure. In this connection it should be noted that the present process is operated at a pressure materially above that of maximum condensation; i. e., materially above the pressure which may be referred to as the pressure at which most efficient separation is effected by retrograde condensation.

In the operation of the present process it is preferred to proceed as specifically described and send all of the liquefiable hydrocarbons in the well fluid to the reabsorption system. Thus, where a separator is employed before the absorber, as shown in Figure 1, it is preferred to mix the separated liquid with the fat oil entering the reabsorption system. Although the advantages of the process are obtained in an important degree by treating this separated liquid apart from the fat oil, the combination of this liquid with the fat oil simplifies the utilization of the light hydrocarbons contained in the liquid. It is possible to operate the process by using two reabsorption systems, one for the fat oil and the other for the separated liquid, but it is thought preferable to employ a single system as shown.

In carrying out the absorption in accordance with the invention various conditions may be maintained, for the improvements described will result in an improved process independently of the particular conditions of absorption or the particular type of oil used. The oil used may be a fraction of the heavy ends of the hydrocarbons in the distillate fluid; e. g. a fraction of the hydrocarbons separated from the fluid at about well head pressure. Also, at a pressure above 3000 pounds per square inch, it is preferred to use an oil rate of about 8 to 14 gallons per 1000 cubic feet of distillate fluid in the gas phase, the conditions being referred to 60° F. and 14.7 pounds per square inch.

An example of the operation of the present process in the manner illustrated in Figure 1 of the drawings is as follows. Applying the process to the recovery of liquefiable hydrocarbons from a distillate fluid of the type described above, the vapors passed to the absorber at a pressure of about 3400 pounds per square inch may have about the following composition:

| Hydrocarbon | Mol. fraction |
| --- | --- |
| Methane | 0.9299 |
| Ethane | 0.0270 |
| Propane | 0.0133 |
| Isobutane | 0.0045 |
| n-Butane | 0.0040 |
| Isopentane | 0.0028 |
| n-Pentane | 0.0012 |
| Hexanes and heavier | 0.0173 |

The absorption operation is preferably carried out by maintaining an oil rate in the absorber of about 10.4 gallons of absorption oil per 1000 cubic feet of vapors. In reabsorber 28 about 1 gallon of oil per 1000 cubic feet is introduced through line 36 into the lower section, and in reabsorber 48 about one-half gallon of oil per 1000 cubic feet is introduced through line 62 into the lower section of this reabsorber. Under these conditions the pressure in reabsorber 28 would be about 2120 pounds per square inch and in reabsorber 48 the pressure would be about 1120 pounds per square inch.

Obviously many modifications and variations of the invention, as hereinbefore set forth, may be made without departing from the spirit and scope thereof, and therefore only such limitations should be imposed as are indicated in the appended claims.

We claim:

1. In a process of separating liquefiable hydrocarbons from residual gases in a fluid flowed from a distillate well at a high pressure within the retrograde condensation range of the constituents of the fluid, said process involving contacting the vapors from the well with a lean absorption oil at a pressure not substantially below said high pressure to absorb liquefiable hydrocarbons and produce a fat absorption oil, the improvement which comprises reducing the pressure on the fat absorption oil in a plurality of stages of decreasing pressure whereby light hydrocarbons are evolved in each stage, converting all of the light hydrocarbons evolved in a stage to the liquid phase by absorbing the light hydrocarbons in lean absorption oil at the reduced pressure, removing lean absorption oil containing absorbed light hydrocarbons from the first stage to which the fat absorption oil is passed, raising the pressure on the lean absorption oil, and passing the lean absorption oil into contact with vapors from the distillate well.

2. In a process of separating liquefiable hydrocarbons from residual gases in a fluid flowed from a high pressure producing well, a substantial proportion at least of said fluid being in the vapor phase, said process involving contacting vapors from the well with a lean absorption oil to absorb liquefiable hydrocarbons and produce a fat absorption oil, the improvement which comprises reducing the pressure on the fat absorption oil to evolve light hydrocarbons, converting all the light hydrocarbons to the liquid phase by contacting the light hydrocarbons with lean absorption oil in an amount in excess of the amount of lean absorption oil employed to contact the vapors from the producing well, raising the pressure on a portion of lean absorption oil containing absorbed light hydrocarbons, and passing this portion of lean absorption oil into contact with the vapors from the producing well.

3. In a process of separating liquefiable hydrocarbons from residual gases in a fluid flowed from a distillate well at a high pressure within the retrograde condensation range of the constituents of the fluid, said process involving contacting the vapors from the well with a lean absorption oil at a pressure not substantially below said high pressure to absorb liquefiable hydrocarbons and produce a fat absorption oil, the improvement which comprises reducing the pressure on the fat absorption oil to evolve light hydrocarbons, converting the light hydrocarbons to the liquid phase by contacting the light hydrocarbons with an amount of lean absorption oil capable of absorbing substantially all of the light hydrocarbons at the existing conditions, said amount being in excess of the amount of absorption oil employed to contact the vapors from the distillate well, combining the excess lean absorption oil after absorption of light hydrocarbons with the fat absorption oil, raising the pressure on the remainder of the lean absorption oil containing absorbed light hydrocarbons, and passing said remainder at the raised pressure into contact with the vapors from the distillate well.

4. In a process of separating liquefiable hydrocarbons from residual gases in a fluid flowed from a distillate well at a high pressure within the retrograde condensation range of the constituents of the fluid and above 2500 pounds per square inch, said process involving contacting the vapors from the well with a lean absorption oil at a pressure not substantially below said high pressure to absorb liquefiable hydrocarbons and produce a fat absorption oil, the improvement which comprises reducing the pressure on the fat absorption oil in a plurality of stages of decreasing pressure whereby light hydrocarbons are evolved in each stage, converting substantially all of the light hydrocarbons evolved in a stage to the liquid phase by contacting the light hydrocarbons with an amount of lean absorption oil capable of absorbing substantially all of said light hydrocarbons at the reduced pressure, said amount of absorption oil being in excess of the amount employed to contact the vapors from the distillate well, combining the excess lean absorption oil after absorption of light hydrocarbons with the fat absorption oil, raising the pressure on the remainder of the lean absorption oil containing absorbed light hydrocarbons, and passing said remainder at the raised pressure into contact with the vapors from the distillate well.

5. In a process of separating liquefiable hydrocarbons from residual gases in a fluid flowed from a distillate well at a high pressure within the retrograde condensation range of the constituents of the fluid and above 2500 pounds per square inch, said process involving contacting the vapors from the well with a lean absorption oil at a pressure not substantially below said high pressure to absorb liquefiable hydrocarbons and produce a fat absorption oil, the improvement which comprises reducing the pressure on the fat absorption oil to evolve light hydrocarbons comprising a proportion of liquefiable hydrocarbons, bringing the evolved light hydrocarbons into contact with an amount of lean absorption oil capable of absorbing all of the light hydrocarbons, at the existing conditions, said amount being in excess of the amount of lean absorption oil contacted with the vapors from the distillate well, the evolved light hydrocarbons being brought first into contact with the excess lean absorption oil and then with the remainder of the lean absorption oil, whereby the excess lean absorption oil contains a substantial proportion of the liquefiable hydrocarbons present in the evolved light hydrocarbons, raising the pressure on the remainder of the lean absorption oil, and passing said remainder at the raised pressure into contact with the vapors from the distillate well.

6. In a process of separating liquefiable hydrocarbons from residual gases in a fluid flowed from a distillate well at a high pressure within the retrograde condensation range of the constituents of the fluid and above 2500 pounds per square inch, said process involving contacting the vapors from the well with a lean absorption oil at a pressure not substantially below said high pressure to absorb liquefiable hydrocarbons and produce a fat absorption oil, the improvement which comprises passing the fat absorption oil to a zone of reduced pressure to evolve light hydrocarbons containing a proportion of liquefiable hydrocarbons, which pass upwardly in said zone, bringing the evolved light hydrocarbons into contact in said zone with an amount of lean absorption oil capable of absorbing all of the light hydrocarbons, said amount being in excess of the amount of absorption oil contacted with the vapors from the distillate well, the lean absorption oil being introduced into said zone at two points, the excess at an intermediate point and the remainder at the upper portion of the zone, whereby the evolved light hydrocarbons come first into contact with the excess lean absorption oil in which a substantial proportion of the liquefiable hydrocarbons are absorbed and then into contact with the remainder of the lean absorption oil, combining the excess lean absorption oil after absorption of light hydrocarbons with the fat absorption oil, raising the pressure on the remainder of the lean absorption oil containing absorbed light hydrocarbons, and passing said remainder at the raised pressure into contact with the vapors from the distillate well.

7. The process of treating a distillate fluid comprising a substantial proportion of vapor phase material produced at a high well-head pressure within the retrograde condensation range of the constituents of the fluid and above 2500 pounds per square inch, which comprises contacting the vapor phase material at a pressure not substantially below well-head pressure with a lean absorption oil containing a substantial proportion of methane and other normally gaseous hydrocarbons present in the vapor phase material, to absorb liquefiable hydrocarbons and leave normally gaseous hydrocarbons in the vapor phase, reducing the pressure on a fat absorption oil which comprises the enriched oil obtained by contacting the lean absorption oil with the vapor phase material and any liquid phase material in the distillate fluid, in a plurality of stages of decreasing pressure, whereby light hydrocarbons are evolved in each stage, said light hydrocarbons comprising methane and other normally gaseous hydrocarbons and a proportion of liquefiable hydrocarbons, contacting the light hydrocarbons in said stages with lean absorption oil flowed through the stages in the direction of increasing pressure, the amount of lean absorption oil employed in a stage being capable of absorbing all of the light hydrocarbons evolved in that stage, said amount being in excess of the amount of absorption oil contacted with the vapor phase material in the distillate fluid, combining the excess lean absorption oil after absorption of light hydrocarbons with the fat absorption oil, raising the pressure on the remainder of the lean absorption oil containing a substantial proportion of methane and other normally gaseous hydrocarbons, passing said remainder at the raised pressure into contact with the vapor phase material in the distillate fluid, recovering distillate and lean absorption oil from the combined fat absorption oil and excess lean absorption oil, and returning the recovered lean absorption oil for use in contacting evolved light hydrocarbons in said stages of decreasing pressure.

8. The process of treating a distillate fluid comprising a substantial proportion of vapor phase materials produced at a high well-head pressure within the retrograde condensation range of the constituents of the fluid and above 3000 pounds per square inch, which comprises contacting the vapor phase material at a pressure of at least 3000 pounds per square inch with a lean absorption oil containing a substantial proportion of methane and other normally gaseous hydrocarbons present in the vapor phase material, to absorb liquefiable hydrocarbons and leave normally gaseous hydrocarbons in the vapor phase, reducing the pressure on a fat absorption oil which comprises the enriched oil obtained by contacting the lean absorption oil with the vapor phase material and any liquid phase material in the distillate fluid, in a plurality of stages of decreasing pressure, whereby light hydrocarbons are evolved in each stage, said light hydrocarbons comprising methane and other normally gaseous hydrocarbons and a proportion of liquefiable hydrocarbons, contacting the light hydrocarbons in said stages with lean absorption oil flowed through the stages in the direction of increasing pressure, the amount of lean absorption oil employed in a stage being capable of absorbing all of the light hydrocarbons evolved in that stage, said amount being in excess of the amount of absorption oil contacted with the vapor phase material in the distillate fluid, the evolved light hydrocarbons being first contacted with the excess lean absorption oil and then with the remainder of the absorption oil, combining the excess lean absorption oil after absorption of light hydrocarbons with the fat absorption oil, raising the pressure on the remainder of the lean absorption oil containing a substantial proportion of methane and other normally gaseous hydrocarbons, passing said remainder at the raised pressure into contact with the vapor phase material in the distillate fluid, recovering distillate and lean absorption oil from the combined fat absorption oil and excess lean absorption oil, and returning the recovered lean absorption oil for use in contacting evolved light hydrocarbons in said stages of decreasing pressure.

9. In a process of separating liquefiable hydrocarbons from residual gases in a fluid flowed from a distillate well at a high pressure within the retrograde condensation range of the constituents of the fluid and above 2500 pounds per square inch, said process involving contacting the vapors from the well with a lean absorption oil at a pressure not substantially below said high pressure to absorb liquefiable hydrocarbons and produce a fat absorption oil, the improvement which comprises reducing the pressure on the fat absorption oil to evolve light hydrocarbons, converting all of said light hydrocarbons to the liquid phase by contacting the light hydrocarbons with lean absorption oil at a temperature substantially below the temperature of absorption and at which an amount of lean absorption oil substantially equal to the amount employed in the absorption is capable of absorbing all of the light hydrocarbons, raising the pressure on the lean absorption oil containing absorbed light hydrocarbons, and passing the lean absorption oil containing absorbed light hydrocarbons at the raised pressure into contact with the vapors from the distillate well.

10. In a process of separating liquefiable hydrocarbons from residual gases in a fluid flowed from a distillate well at a high pressure within the retrograde condensation range of the constituents of the fluid and above 2500 pounds per square inch, said process involving contacting the vapors from the well with a lean absorption oil at a pressure not substantially below said high pressure to absorb liquefiable hydrocarbons and produce a fat absorption oil, the improvement which comprises passing the fat absorption oil through a plurality of stages of decreasing pressure and temperature whereby light hydrocarbons are evolved in each stage, passing lean absorption oil through said stages in the direction of increasing pressure and temperature, converting light hydrocarbons in a stage to the liquid phase by contacting the light hydrocarbons with lean absorption oil at a temperature substantially below the temperature of absorption and at which an amount of lean absorption oil substantially equal to the amount employed in the absorption is capable of absorbing all of the light hydrocarbons, raising the pressure on the lean absorption oil containing absorbed light hydrocarbons leaving the stage of highest pressure and temperature, and passing the lean absorption oil containing absorbed light hydrocarbons at the raised pressure into contact with the vapors from the distillate well.

11. The process of treating a distillate fluid comprising a substantial proportion of vapor phase material produced at a high well-head pressure within the retrograde condensation range of the constituents of the fluid and above 3000 pounds per square inch, which comprises contacting the vapor phase material at a pressure of at least 3000 pounds per square inch with a lean absorption oil containing a substantial proportion of methane and other normally gaseous hydrocarbons present in the vapor phase material, to absorb liquefiable hydrocarbons and leave normally gaseous hydrocarbons in the vapor phase, passing the fat absorption oil which comprises the enriched oil obtained by contacting the lean absorption oil with vapor phase material and any liquid phase material in the distillate fluid, through a plurality of stages of decreasing pressure and temperature, whereby light hydrocarbons comprising methane and other normally gaseous hydrocarbons and a proportion of liquefiable hydrocarbons are evolved in each stage, contacting the light hydrocarbons in said stages with lean absorption oil flowed through the stages in the direction of increasing pressure and temperature, the lean absorption oil in a stage being substantially below the temperature of absorption and at which an amount of lean absorption oil equal to the amount employed in the absorption is capable of absorbing all of the light hydrocarbons evolved in that stage, raising the pressure on the lean absorption oil containing a substantial proportion of methane and other normally gaseous hydrocarbons leaving the stage of highest pressure and temperature to a pressure of at least 3000 pounds per square inch and passing said lean absorption oil at the raised pressure into contact with the vapor phase material in the distillate fluid, recovering distillate and lean absorption oil from the fat absorption oil, and returning the recovered lean absorption oil for use in contacting evolved light hydrocarbons in said stages of decreasing pressure and temperature.

12. In a process of separating liquefiable hydrocarbons from light hydrocarbons in a hydrocarbon mixture involving contacting said mixture in the vapor phase at a high pressure with an absorption oil to absorb said liquefiable hydrocarbons and also a portion of said light hydrocarbons and produce a fat absorption oil, the improvement which comprises passing the fat absorption oil to a zone of reduced pressure to evolve hydrocarbons, converting all of said evolved hydrocarbons to the liquid phase by absorbing said evolved hydrocarbons in lean absorption oil in the zone of reduced pressure, raising the pressure on at least a part of the lean absorption oil containing absorbed hydrocarbons, and passing lean absorption oil containing absorbed hydrocarbons at the raised pressure into contact with said hydrocarbon mixture.

13. A process of separating liquefiable hydrocarbons from light hydrocarbons in a hydrocarbon mixture which comprises passing said hydrocarbon mixture in the vapor phase and at a high pressure into contact with an absorption oil containing absorbed hydrocarbons as described below in an absorption zone under conditions of rate of absorption oil flow and temperature adjusted to absorb hydrocarbons of predetermined composition comprising liquefiable hydrocarbons and a proportion of the light hydrocarbons, passing resulting fat absorption oil from the absorption zone to a closed zone of selected reduced pressure wherein absorbed hydrocarbons are evolved from said fat absorption oil, introducing absorption oil into the zone of reduced pressure, controlling the pressure in said zone of reduced pressure by control of at least one of the factors, rate of introduction of absorption oil into said zone of reduced pressure and the temperature of the introduced absorption oil, the evolution of hydrocarbons being automatically adjusted such that the evolved hydrocarbons are all absorbed in the absorption oil in said zone of reduced pressure, and utilizing absorption oil containing absorbed hydrocarbons in said absorption zone after raising the pressure thereon.

14. A process of separating liquefiable hydrocarbons from light hydrocarbons in a hydrocarbon mixture which comprises passing said hydrocarbon mixture in the vapor phase and at a high pressure into contact with an absorption oil containing absorbed hydrocarbons as described below in an absorption zone under conditions of rate of absorption oil flow and temperature adjusted to absorb hydrocarbons of predetermined composition comprising liquefiable hydrocarbons and a proportion of the light hydrocarbons, passing resulting fat absorption oil from the absorption zone to a closed zone of selected reduced pressure wherein absorbed hydrocarbons are evolved from said fat absorption oil, introducing absorption oil into the zone of reduced pressure, controlling the pressure in said zone of reduced pressure by the rate of introduction of absorption oil into said zone of reduced pressure, the amount of absorption oil introduced into said zone of reduced pressure being in excess of the amount of absorption oil contacted with said hydrocarbon mixture in said absorption zone, the evolution of hydrocarbons being automatically adjusted such that the evolved hydrocarbons are all absorbed in the absorption oil in said zone of reduced pressure, and utilizing absorption oil containing absorbed hydrocarbons in said absorption zone after raising the pressure thereon.

15. A process of separating liquefiable hydrocarbons from light hydrocarbons in a hydrocarbon mixture which comprises passing said hydrocarbon mixture in the vapor phase and at a high pressure into contact with an absorption oil containing absorbed hydrocarbons as described below in an absorption zone under conditions of rate of absorption oil flow and temperature adjusted to absorb hydrocarbons of predetermined composition comprising liquefiable hydrocarbons and a proportion of the light hydrocarbons, passing resulting fat absorption oil from the absorption zone to a closed zone of selected reduced pressure wherein absorbed hydrocarbons are evolved from said fat absorption oil, introducing absorption oil into the zone of reduced pressure at a temperature below the temperature of the absorption oil contacted with said hydrocarbon mixture in said absorption zone, to control the pressure in said zone of reduced pressure, the evolution of hydrocarbons being automatically adjusted such that the evolved hydrocarbons are all absorbed in the absorption oil in said zone of reduced pressure, and utilizing absorption oil containing absorbed hydrocarbons in said absorption zone after raising the temperature and pressure of said absorption oil.

16. A process of separating liquefiable hydrocarbons from light hydrocarbons in a hydrocarbon mixture which comprises passing said hydrocarbon mixture in the vapor phase and at a high pressure into contact with an absorption oil containing absorbed hydrocarbons as described below in an absorption zone under conditions of rate of absorption oil flow and temperature adjusted to absorb hydrocarbons of predetermined composition comprising liquefiable hydrocarbons and a proportion of the light hydrocarbons, passing resulting fat absorption oil from the absorption zone to a closed zone of selected reduced pressure wherein absorbed hydrocarbons are evolved from said fat absorption oil, contacting said evolved hydrocarbons with an amount of absorption oil capable of absorbing all of said evolved hydrocarbons, said amount being in excess of the amount of absorption oil contacted with said hydrocarbon mixture in said absorption zone, said evolved hydrocarbons being contacted first with the excess absorption oil and then with the remainder of said absorption oil, combining said enriched excess absorption oil with said fat absorption oil, and utiliizng said remainder of said absorption oil for contacting said hydrocarbon mixture after raising the pressure thereon.

17. In a process of separating liquefiable hydrocarbons from residual gases in a fluid flowed at a high pressure from a producing well involving contacting vapors of said fluid at a high pressure with an absorption oil to absorb said liquefiable hydrocarbons and also a portion of said residual gases and produce a fat absorption oil, the improvement which comprises passing the fat absorption oil to a zone of reduced pressure to evolve hydrocarbons, converting all of said evolved hydrocarbons to the liquid phase by absorbing said evolved hydrocarbons in lean absorption oil in the zone of reduced pressure, raising the pressure on at least a part of the lean absorption oil containing absorbed hydrocarbons, and passing the absorption oil containing absorbed hydrocarbons into contact with said vapors of said fluid.

18. In a process of separating liquefiable hydrocarbons from residual gases in a fluid flowed at a high pressure from a producing well involving contacting vapors of said fluid at a high pressure with an absorption oil to absorb hydrocarbons of predetermined composition comprising liquefiable hydrocarbons and a proportion of the residual gases and produce a fat absorption oil, the improvement which comprises passing said fat absorption oil from the absorption zone to a closed zone of selected reduced pressure wherein absorbed hydrocarbons are evolved from said fat absorption oil, introducing absorption oil into the zone of reduced pressure, controlling the pressure in said zone of reduced pressure by control of at least one of the factors, rate of introduction of absorption oil into said zone of reduced pressure and the temperature of the introduced absorption oil, the evolution of hydrocarbons being automatically adjusted such that the evolved hydrocarbons are all absorbed in the absorption oil in said zone of reduced pressure, and utilizing absorption oil containing absorbed hydrocarbons in said absorption zone after raising the pressure thereon.

19. A process of separating liquefiable hydrocarbons from residual gases in a fluid flowed from a distillate well at a high pressure within the retrograde condensation range of the constituents of the fluid, which comprises passing vapors of said fluid at a high pressure into contact with an absorption oil containing absorbed hydrocarbons as described below in an absorption zone under conditions of rate of absorption oil flow and temperature adjusted to absorb hydrocarbons of predetermined composition comprising liquefiable hydrocarbons and a proportion of the residual gases, passing resulting fat absorption oil from the absorption zone to a closed zone of selected reduced pressure wherein absorbed hydrocarbons are evolved from said fat absorption oil, introducing absorption oil into the zone of reduced pressure, controlling the pressure of said zone of reduced pressure by the rate of introduction of absorption oil into said zone of reduced pressure, the amount of absorption oil introduced into said zone of reduced pressure being in excess of the amount of absorption oil contacted with vapors of said fluid in said absorption zone, the evolution of hydrocarbons being automatically adjusted such that the evolved hydrocarbons are all absorbed in the absorption oil in said zone of reduced pressure, and utilizing absorption oil containing absorbed hydrocarbons in said absorption zone after raising the pressure thereon.

20. A process of separating liquefiable hydrocarbons from residual gases in a fluid flowed from a distillate well at a high pressure within the retrograde condensation range of the constituents of the fluid, which comprises passing vapors of said fluid at a high pressure into contact with an absorption oil containing absorbed hydrocarbons as described below in an absorption zone under conditions of rate of absorption oil flow and temperature adjusted to absorb hydrocarbons of predetermined composition comprising liquefiable hydrocarbons and a proportion of the residual gases, passing resulting fat absorption oil from the absorption zone to a closed zone of selected reduced pressure wherein absorbed hydrocarbons are evolved from said fat absorption oil, introducing absorption oil into the zone of reduced pressure at a temperature below the temperature of the absorption oil contacted with said vapors in said absorption zone, to control the pressure in said zone of reduced pressure, the evolution of hydrocarbons being automatically adjusted such that the evolved hydrocarbons are all absorbed in the absorption oil in said zone of reduced pressure, and utilizing absorption oil containing absorbed hydrocarbons in said absorption zone after raising the pressure thereon.

ALLEN D. GARRISON.
WILLIAM D. YALE.